US012781637B2

(12) United States Patent
Winder et al.

(10) Patent No.: US 12,781,637 B2
(45) Date of Patent: Nov. 3, 2026

(54) GAS TURBINE ENGINE WITH CARBON/CARBON COMPOSITE PISTON SEAL

(71) Applicant: RTX CORPORATION, Farmington, CT (US)

(72) Inventors: Calvin Jay Winder, Cromwell, CT (US); Fadi S. Maalouf, East Hampton, CT (US); Matthew E. Bintz, West Hartford, CT (US); Peter T. Schutte, Manchester, CT (US); Pieter Van Lieu, Cheshire, CT (US); Justin Roger DeLarm, Bolton, CT (US); Anna Lauren Wright, Poulsbo, WA (US); Hamidreza Mohseni, Avon, CT (US); David R. Lyders, Glastonbury, CT (US); Xiaomei Fang, South Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/261,035

(22) Filed: Jul. 7, 2025

(65) Prior Publication Data

US 2025/0334054 A1 Oct. 30, 2025

Related U.S. Application Data

(62) Division of application No. 17/994,188, filed on Nov. 25, 2022, now Pat. No. 12,352,173.

(51) Int. Cl.
*F01D 11/00* (2006.01)
*C04B 35/628* (2006.01)
(Continued)

(52) U.S. Cl.
CPC ...... *F01D 11/003* (2013.01); *C04B 35/62873* (2013.01); *C04B 35/83* (2013.01);
(Continued)

(58) Field of Classification Search
CPC . F01D 11/003; C04B 35/62873; C04B 35/83; C04B 2235/422; C04B 2235/5248;
(Continued)

(56) References Cited

U.S. PATENT DOCUMENTS 1,339,297 A 5/1920 Spicer
4,750,746 A 6/1988 Boudot et al.
(Continued)

FOREIGN PATENT DOCUMENTS

CN 101954676 1/2011
CN 101954676 A * 1/2011
(Continued)

OTHER PUBLICATIONS

European Search Report for European Patent Application No. 23210972.8 mailed Jul. 19, 2024.
(Continued)

*Primary Examiner* — Nathaniel E Wiehe
*Assistant Examiner* — Theodore C Ribadeneyra
(74) *Attorney, Agent, or Firm* — Carlson, Gaskey & Olds, P.C.

(57) ABSTRACT

A method for processing a seal for a gas turbine engine includes providing a carbon fiber preform, densifying the carbon fiber preform with a carbon matrix to form a carbon/carbon composite ring, and forming a seal by cutting the carbon/carbon composite ring to form at least one seam at which opposed ends of the carbon/carbon composite ring meet.

20 Claims, 8 Drawing Sheets

(51) Int. Cl.
*C04B 35/83* (2006.01)
*F02C 7/28* (2006.01)

(52) U.S. Cl.
CPC .......... *F02C 7/28* (2013.01); *C04B 2235/422* (2013.01); *C04B 2235/5248* (2013.01); *C04B 2235/5252* (2013.01); *F05D 2220/32* (2013.01); *F05D 2230/10* (2013.01); *F05D 2240/55* (2013.01)

(58) Field of Classification Search
CPC ............... C04B 2245/5252; F02C 7/28; F05D 2220/32; F05D 2230/10; F05D 2240/55; F05D 2300/6033; B29C 70/545
See application file for complete search history.

(56) References Cited

U.S. PATENT DOCUMENTS

| | | | | |
|---|---|---|---|---|
| 5,934,680 | A | 8/1999 | Kakehi et al. | |
| 5,939,216 | A | 8/1999 | Kameda et al. | |
| 6,004,671 | A | 12/1999 | Yamamura et al. | |
| 6,025,048 | A | 2/2000 | Cutler et al. | |
| 6,349,943 | B1 | 2/2002 | Ishii et al. | |
| 6,418,973 | B1 | 7/2002 | Cox et al. | |
| 9,945,295 | B2 | 4/2018 | Porter et al. | |
| 10,982,767 | B2 | 4/2021 | Shimizu et al. | |
| 11,231,042 | B2 | 1/2022 | Werdecker et al. | |
| 11,542,819 | B2 | 1/2023 | Heyerman | |
| 2002/0154741 | A1 | 10/2002 | Rigali et al. | |
| 2005/0116426 | A1 | 6/2005 | Watanabe et al. | |
| 2009/0091088 | A1 | 4/2009 | Berendt | |
| 2010/0051863 | A1* | 3/2010 | Mazany .................. | C04B 41/52 252/188.28 |
| 2010/0081350 | A1 | 4/2010 | McCabe et al. | |
| 2010/0330858 | A1 | 12/2010 | Okada et al. | |
| 2011/0030940 | A1 | 2/2011 | Takeda | |
| 2012/0112415 | A1 | 5/2012 | Benjamin et al. | |
| 2013/0051993 | A1 | 2/2013 | Webb | |
| 2013/0116109 | A1 | 5/2013 | Ritti et al. | |
| 2015/0291905 | A1 | 10/2015 | Takahashi et al. | |
| 2016/0060115 | A1 | 3/2016 | La Forest et al. | |
| 2016/0084099 | A1 | 3/2016 | Davis et al. | |
| 2016/0116010 | A1* | 4/2016 | Valle ..................... | B29C 70/545 188/218 XL |
| 2016/0312633 | A1 | 10/2016 | Sevincer et al. | |
| 2017/0144925 | A1 | 5/2017 | Dunn et al. | |
| 2018/0291815 | A1 | 10/2018 | Munson et al. | |
| 2019/0338658 | A1 | 11/2019 | Weaver | |
| 2020/0025002 | A1* | 1/2020 | Shapiro ................... | F01D 9/044 |
| 2020/0148340 | A1 | 5/2020 | Poteet et al. | |
| 2020/0250002 | A1 | 8/2020 | Gururaj et al. | |
| 2020/0299200 | A1 | 9/2020 | Sheedy et al. | |
| 2020/0318489 | A1 | 10/2020 | Webb | |
| 2021/0017871 | A1* | 1/2021 | Blaney .................. | F01D 25/246 |
| 2021/0040892 | A1 | 2/2021 | Stoyanov et al. | |
| 2021/0071541 | A1 | 3/2021 | Thirumalai et al. | |
| 2021/0079801 | A1 | 3/2021 | Stoyanov et al. | |
| 2022/0154590 | A1 | 5/2022 | Berard | |
| 2022/0259975 | A1 | 8/2022 | Heyerman | |
| 2022/0381373 | A1 | 12/2022 | Nakayama et al. | |

FOREIGN PATENT DOCUMENTS

| | | | |
|---|---|---|---|
| CN | 104500743 | 4/2015 | |
| DE | 102016113198 | 1/2018 | |
| DE | 102017130965 | 6/2019 | |
| EP | 2910824 | 11/2018 | |
| WO | WO-2014174540 A1 * | 10/2014 | ............. B29C 70/32 |

OTHER PUBLICATIONS

Partial European Search Report for European Patent Application No. 23210972.8 mailed Apr. 3, 2024.

Shi, Q. & Zhao, S. (2016). Engineering method to build the composite structure ply database. Results in Physics vol. 6. 2016. pp. 434-439.

* cited by examiner

GAS TURBINE ENGINE WITH CARBON/CARBON COMPOSITE PISTON SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

A method for processing a seal for a gas turbine engine according to an example of the present disclosure includes providing a carbon fiber preform, densifying the carbon fiber preform with a carbon matrix and forming a carbon/carbon composite ring, and forming a seal by cutting the carbon/carbon composite ring to form at least one seam at which opposed ends of the carbon/carbon composite ring meet.

In a further example of any of the preceding or succeeding embodiments, the seal has a multi-layer configuration of fiber plies in an axially stacked arrangement.

In a further example of any of the preceding or succeeding embodiments, the seal has a multi-layer configuration of fiber plies in a radially stacked arrangement.

In a further example of any of the preceding or succeeding embodiments, the seal has a layer-less configuration in which the carbon fibers have a unidirectional orientation and extend circumferentially.

In a further example of any of the preceding or succeeding embodiments, the carbon fibers are in flat tows that are elongated in directions that are oblique to the engine central axis.

In a further example of any of the preceding or succeeding embodiments, the seal includes an annular core that extends along a central core axis, and the carbon fibers are in flat tows that are would around the central core axis on the annular core.

In a further example of any of the preceding or succeeding embodiments, the seal extends circumferentially along a seal axis, and the carbon fibers are in strands that are braided around the seal axis.

In a further example of any of the preceding or succeeding embodiments, the seal has a 3-D fiber architecture.

In a further example of any of the preceding or succeeding embodiments, in the seal the carbon fibers are, by volume, 35% to 65% of the carbon/carbon composite ring.

In a further example of any of the foregoing embodiments, the seal includes an annular core extending along a central core axis, and the carbon fiber preform includes carbon fibers arranged in a series of flat tows that are wound around the central core axis on the annular core such that each of the flat tows partially overlaps an immediately prior flat tow in the series of flat tows.

In a further example of any of the foregoing embodiments, each of the flat tows are wound fully circumferentially around the central core.

In a further example of any of the foregoing embodiments, in the seal the carbon fibers are, by volume, 35% to 65% of the carbon/carbon composite ring.

In a further example of any of the foregoing embodiments, edges of the flat tows lie in a plane of an outer surface of the seal.

In a further example of any of the foregoing embodiments, the carbon matrix is disposed in between the edges of the flat tows.

In a further example of any of the foregoing embodiments, the edges of the flat tows are exposed at the outer surface of the seal.

In a further example of any of the foregoing embodiments, the carbon fiber preform is a cylinder, densifying of the carbon fiber preform produces a densified cylindrical workpiece, and the forming of the carbon/carbon composite ring includes cutting the carbon/carbon composite ring from the densified cylindrical workpiece.

In a further example of any of the foregoing embodiments, the forming includes cutting at least one lapjoint joint seam, butt joint seam, or scarf joint seam in the carbon/carbon composite ring to produce a split ring.

In a further example of any of the foregoing embodiments, the forming includes cutting at least one lapjoint joint seam in the carbon/carbon composite ring to produce a split ring.

A further example of any of the foregoing embodiments further includes infiltrating an oxidation inhibitor into pores of the carbon/carbon composite ring.

In a further example of any of the foregoing embodiments, the oxidation inhibitor is mono-aluminum-phosphate.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
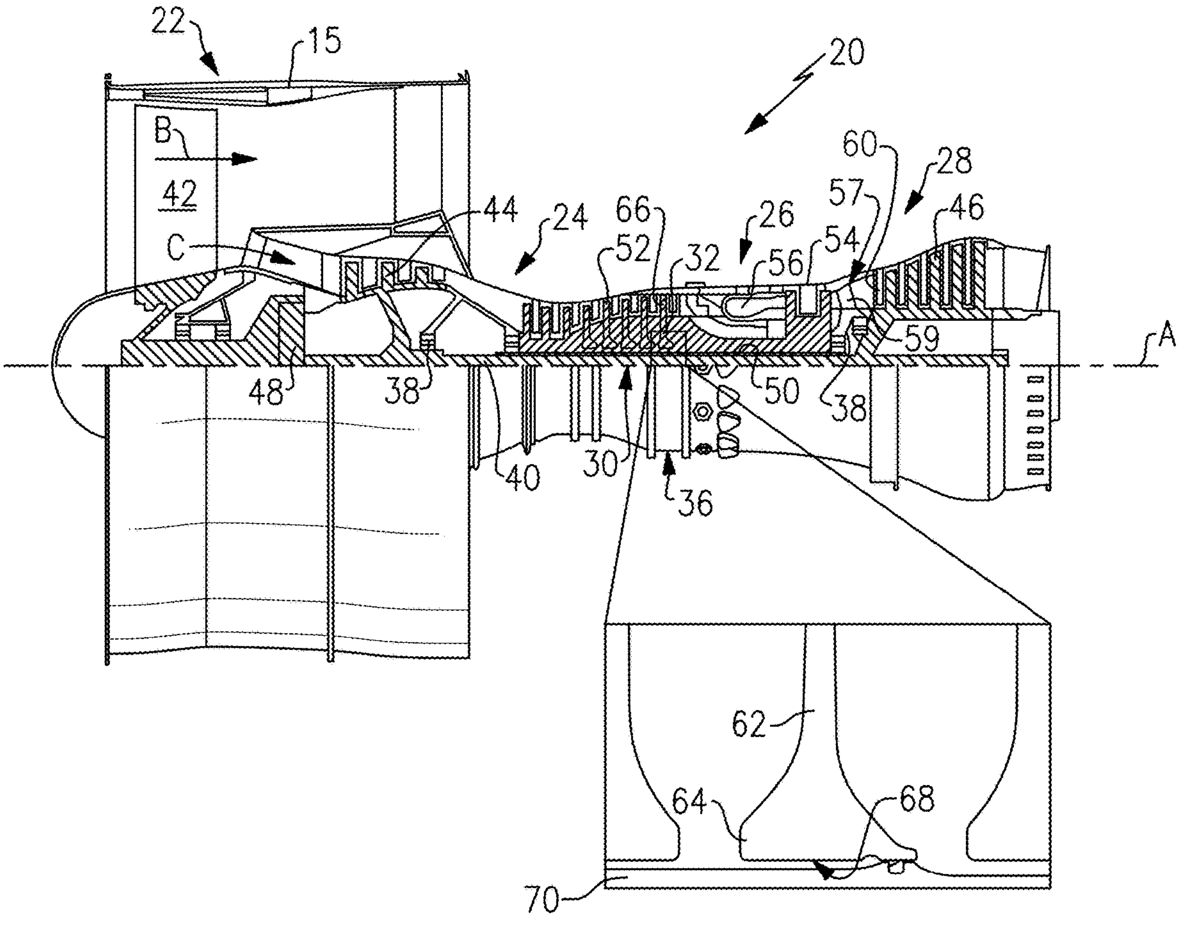
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

The high pressure compressor 52 includes a rotor 62 that has a portion 64 (shown in FIG. 1 inset). In this example, the rotor 62 carries rotor blades 66, which may be integral with the rotor 62 or mechanically attached to the rotor 62. It is to be understood, however, that in other examples the rotor 62 may not have blades. The portion 64 defines a seal surface 68. In this example, the seal surface 68 is in a central bore of the rotor 62, but it could alternatively be on a flange or arm that extends from the rotor 62. A shaft 70 extends through the bore. The shaft 70 may be part of the high speed spool 32. The rotor 62 and the shaft 70 are rotatable in the same direction about the engine central axis A.

Figure 2:
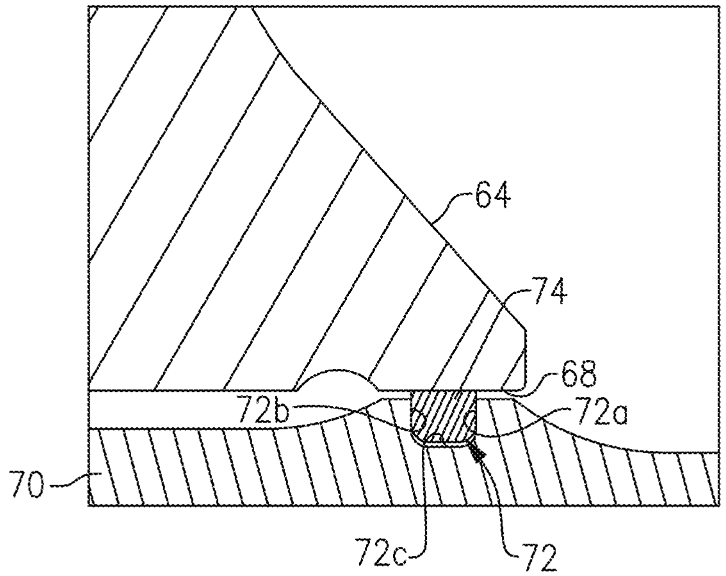
FIG. 2 illustrates a seal between a rotor hub and a shaft.

FIG. 2 illustrates a sectioned view taken in a plane that includes the axis A. The shaft 70 defines an annular seal channel 72. The channel 72 has fore and aft channel sides 72*a*/72*b*, a channel floor 72*c*, and a top that opens to the seal surface 68. There is a seal 74 disposed in the channel 72 for sealing against the seal surface 68. The seal 74 may also be considered to be a piston seal. When the engine 20 is running, there is a pressure differential between the upstream and downstream regions of the rotor 62. The seal 74 facilitates isolating those pressure regions from each other.

Figure 3A:
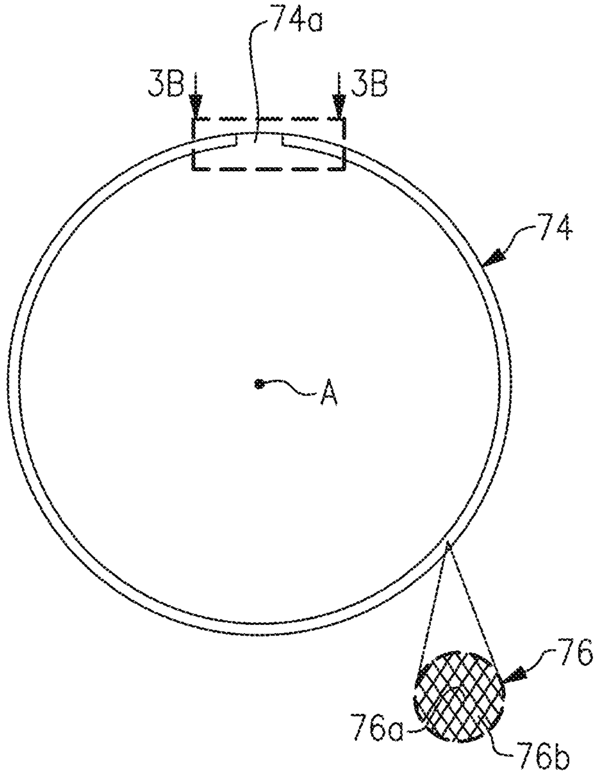
FIG. 3A illustrates an axial view of a seal.
Figure 3B:
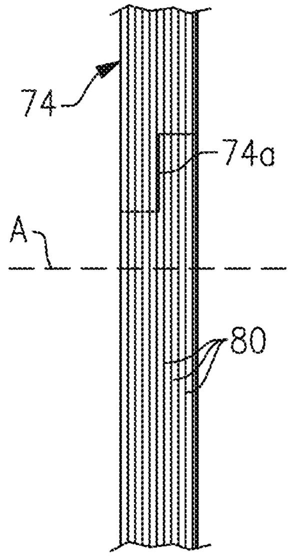
FIG. 3B illustrates a radial view of the seal.

FIG. 3A shows an axial view of the seal 74, and FIG. 3B shows a sectioned view of a representative portion of the seal 74. The seal 74 is a ring and includes one or more seams 74*a*. In the illustrated example, the seal 74 includes only one seam 74*a* and may thus be considered to be a split ring. Alternatively, the seal 74 may be segmented by two or more seams 74*a* and thus include two or more pieces that, when assembled, form a ring. The seam 74*a* shown is a lapjoint but it is to be understood that other type of seam joints may be used, such as but not limited to butt joints and scarf joints.

The seal 74 is made of a composite 76 (inset FIG. 3A) having carbon fibers 76*a* disposed in a carbon matrix 76*b*. For example, the fibers 76*a* and the matrix 76*b* are substantially pure graphite, and the carbon fibers 76*a* are, by volume, 35% to 65% of the composite 76. The remainder of the volume of the composite 76 is made up by the matrix 76*b* and porosity. The composite 76 may also include an oxidation inhibitor wash 78 to facilitate oxidation resistance of the graphite. For example, the oxidation inhibitor wash 78 is mono-aluminum-phosphate. The oxidation inhibitor wash 78 is infiltrated into pores of the composite 76 to coat and protect the graphite. In this regard, substantially higher volume percentages of the fibers 76*a* may inhibit infiltration, while substantially lower volume percentages may make the composite 76 weak.

The seal 74 in this example has a multi-layer configuration of fiber plies 80 in an axially stacked arrangement (FIG. 3B). The plies 80 may be, but are not limited to, woven fabric sheets, unidirectional sheets, and non-woven sheets. The fiber plies 80 are arranged back-to-back such that the plies 80 are substantially parallel to each other and perpendicular to the engine central axis A. As will be appreciated, the plies 80 may deviate by a few degrees from perpendicular due to waviness or dimensional tolerances of the plies 80, for example. The surfaces of the seal 74 may be machined or otherwise treated to give the seal 74 a desired geometry and finish.

The seal 74 is installed into the channel 72 by initially diametrically expanding the seal 74. For instance, the ends of the seal 74 at the split seam 74*a* are moved apart, thereby enlarging the seal 74 and enabling it to fit over the shaft 70 into the channel 72. Although the composite 76 is somewhat stiff, the radial height and axial width of the seal 74 are thin and allow the seal 74 to flex when the ends are moved apart. For instance, the seal 74 is up to 0.5 inches in radial height and 0.5 inches in axial width. The deformation of the seal 74 is within the elastic regime and the seal 74 thus springs back to closed once in the channel 72 is in a state of rest with no forces applied such that the ends again meet at the split seam 74*a*.

Figure 4A:
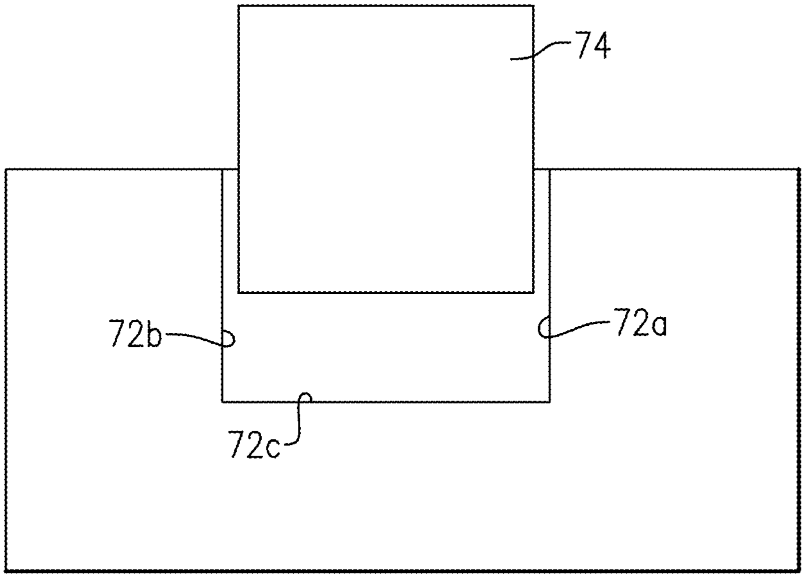
FIG. 4A illustrates a seal after installation into a seal channel, where the seal is unseated and in a state of rest.
Figure 4B:
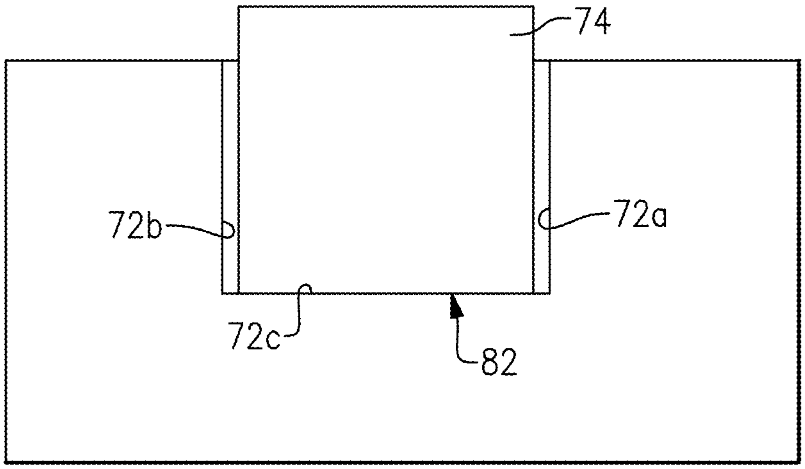
FIG. 4B illustrates the seal after diametric compression to seat the seal.

FIG. 4A shows the seal 74 in the state of rest in the channel 72. The seal 74 is diametrically oversized for the channel 72 such that in the state of rest the seal 74 is unseated with respect to the channel floor 72*c*. The seal 74 is then diametrically compressed to a compressed state, as shown in FIG. 4B, such that the seal 74 seats onto the channel floor 72*c*. The seated position provides clearance for the shaft 70 to be received into the bore 68 during installation without the seal 74 "catching" on the side of the hub 62.

The seal 74 is compressed by moving the ends of the seal 74 in the split seam 74*a* closer together. The seal 74 may in some instances stay in the seated position if there is enough friction to resist springing to an expanded state. However, as the graphite is a low-friction material, an adhesive 82 may be needed between the seal 74 and the channel floor 72*c* to hold the seal 74 in the seated position. The adhesive 82 may be a polymeric material that degrades when exposed to engine operational temperatures such that the seal 74 releases and diametrically expands by its elastic springback into contact with the seal surface 68 of the bore 68 for sealing. The seal 74 is thus biased toward contact with the rotor 62 and is not reliant on pressures or forces to engage for sealing. Alternatively, the seal 74 may be diametrically fit to the channel 72 such that in the state of rest the seal 74 is seated with respect to the channel floor 72*c*. In that case, the seal 74 would initially seat and then expand under centrifugal forces to engage for sealing when the shaft 70 rotates.

Figure 5:
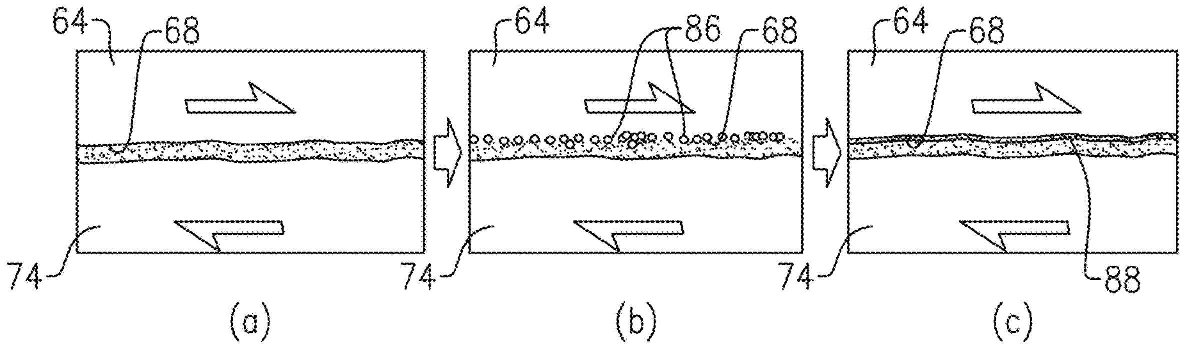
FIG. 5 illustrates a representative portion of a seal during engine operation.

FIG. 5 illustrates the seal 74 during engine operation. As shown in section (a), the seal 74 (which is rotating with the shaft 70) is in contact with the hub 64, which is rotating in the same direction. Across engines cycles and missions, however, there is relative movement between the seal 74 and the seal surface 68 of the rotor 62. Such movement may include axial, radial, and circumferential movement, for example. Initially there is abrasive wear between the seal surface 68 (of the portion 64 of the rotor 62) and the surface of the seal 74. As shown in section (b), the wear produces small particles 86, or powder, of graphite and/or amorphous carbon that can remain in the interface between the seal surface 68 and the surface of the seal 74. With continued sealing engagement, carbon from the particles 86 bonds with oxygen-containing groups on the surface of the seal 74 to form a lubricious film 88, as shown in section (c), which facilitates wear reduction of the seal surface 68 of the rotor 62 (which is made of a metallic alloy).

It is desirable to reduce wear on a rotor, as rotors are typically large, expensive components that cannot be easily repaired or replaced. Sealing between a shaft and a rotor, however, is particularly challenging in that regard. Even though the seal and the rotor are rotating in the same direction with no or substantially no relative rotational movement there between, the seal can shift through various engine cycles, potentially wearing the rotor. The disclosed seal 74 is made of the carbon/carbon composite 76 and is low in weight/density. In comparison to a denser metallic seals, the seal 74 thus produces lower centrifugal forces against the rotor 62, thereby facilitating reductions in wear. Additionally, the seal 74 is highly lubricious in comparison to metallic seals, which may further facilitate wear reduction. For example, the lubricious film 88 may exhibit a film transfer mode of low wear.

As discussed above, the seal 74 has a multi-layer configuration in which the fiber plies 80 are arranged in an axially stacked arrangement. In such a configuration, the planes of the plies 80, and thus the fibers 76*a* in the plies 80, lie substantially perpendicular to the axis A. The seal 74 thus has good stiffness under axial and tangential forces due to this orientation of the plies. Moreover, the fibers 76*a* in this orientation will be substantially "end-on" at the outer diameter surface of the seal 74. As a result, the outer surface will have the ends of the fibers 76*a* with carbon matrix 76*b* in between (as opposed to the fibers 76*a*, or portions thereof, lying length-wise in the plane of the outer surface). Such a surface configuration may be selected to tailor the wear performance of the seal 74.

Figure 6:
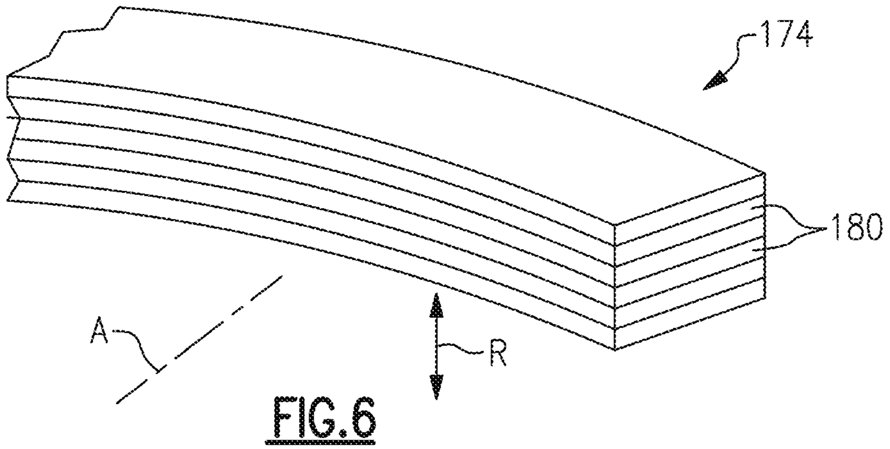
FIG. 6 illustrates a portion of a seal that has a radially stacked arrangement.
Figure 7:
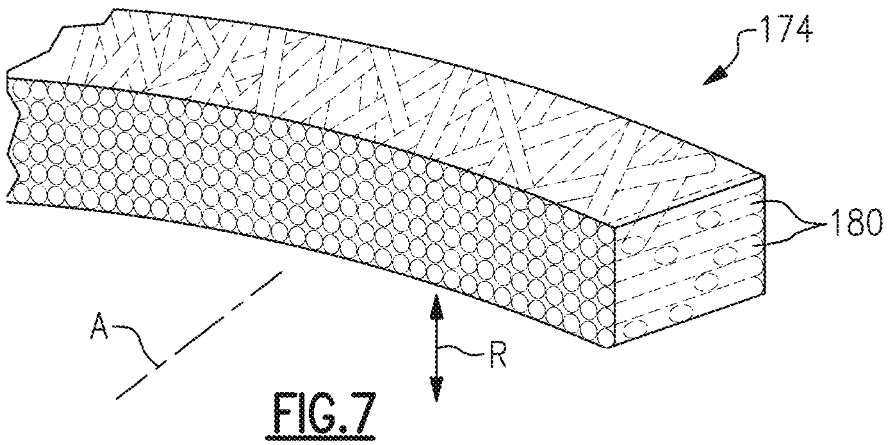
FIG. 7 illustrates a portion of a seal that has a radially stacked arrangement of woven fabric.

FIG. 6 illustrates a representative portion of another example seal 174 that also has a multi-layer configuration. In this example, rather than an axially stacked arrangement, the fiber plies 180 are arranged in a radially stacked arrangement (radial direction R with respect to the axis A). In such a configuration, the planes of the plies 80, and thus the fibers 76*a* in the plies 80, lie substantially perpendicular to the radial direction R. The seal 174 has good radial stiffness due to this orientation. Moreover, the fibers 76*a* or portions thereof will lie length-wise in the plane of the outer surface of the seal 174. As a result, the outer surface will have the lengths of the fibers 76*a* with carbon matrix 76*b* in between (as opposed to the fiber ends). Such a surface configuration may also be selected to tailor the wear performance of the seal 174. FIG. 7 illustrates a representative portion of a further example of the seal 174. In this example, each of the plies 180 is a woven layer of fabric.

Figure 8:
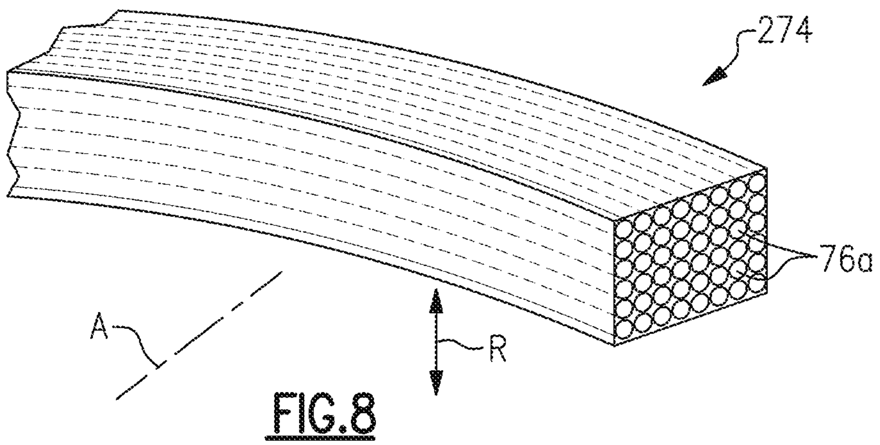
FIG. 8 illustrates a portion of a seal that has unidirectional fibers that extend circumferentially.

FIG. 8 illustrates a representative portion of another example seal 274 that has a layer-less configuration. In this example, the fibers 76*a* have a unidirectional orientation and extend circumferentially. In such a configuration, there are no plies or ply planes, but the length-wise directions of the fibers 76*a* lie substantially perpendicular to the radial direction R. In comparison to the seal 174, the seal 274 may have enhanced strength and radial stiffness due to the unidirectional orientation. For example, unlike fibers in a fabric, the unidirectionally oriented fibers are not interwoven and thus do not bend over and under other fibers like in a weave.

Figure 9:
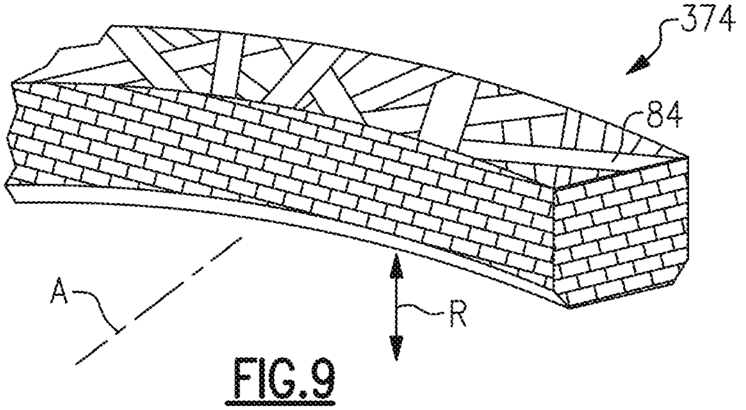
FIG. 9 illustrates a portion of a seal that has flat tows.

FIG. 9 illustrates a representative portion of another example seal 374 that also has a layer-less configuration. In this example, the afore-mentioned fibers 76*a* are in flat tows 84 that are elongated in directions that are oblique to the axis A (superimposed in the figure). A tow is a bundle of continuous filaments or fibers. In this case, each tow is flat such that the aspect ratio of the tow width to the tow thickness is substantially greater than one, such as an aspect ratio of two, three, or more. The tows may be spread in a known manner during processing to form the flat shape. In such a configuration, there are no ply planes, but the length-wise directions of the tows 84 lie substantially perpendicular to the radial direction R. Similar to the seal 174, the seal 374 has good radial stiffness due to this orientation. Moreover, the tows 84 or portions thereof will lie length-wise in the plane of the outer surface of the seal 374. As a result, the outer surface of the seal 374 will be mostly made up of the tows 84, which as above, may be selected to tailor wear performance.

Figure 10A:
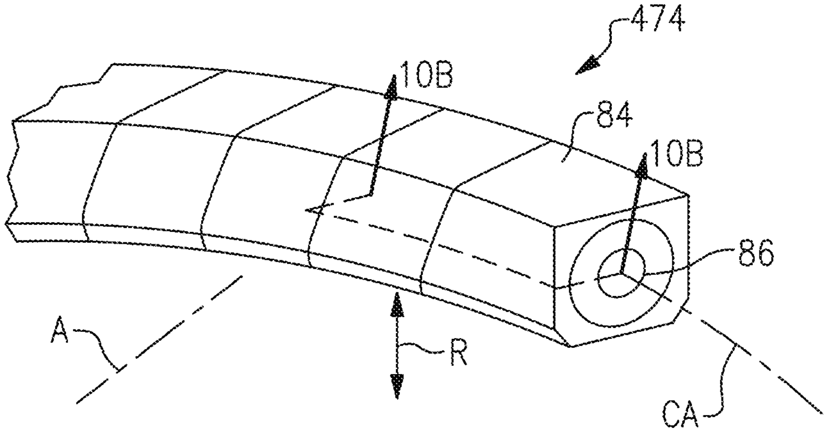
FIG. 10A illustrates a portion of a seal that has strands or tows wrapped around a seal core.
Figure 10B:
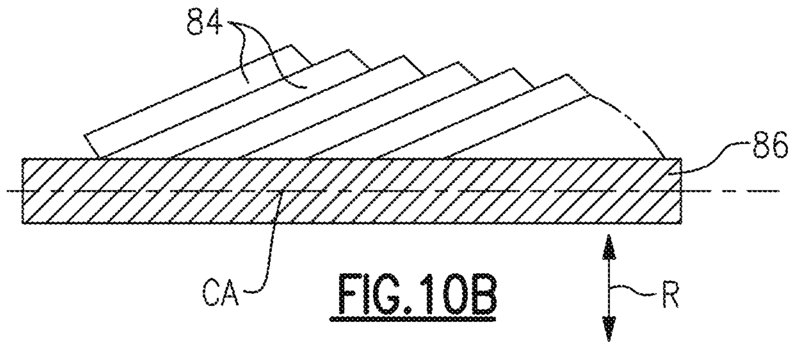
FIG. 10B illustrates a sectioned view of a portion of the seal of FIG. 10A.

FIG. 10A illustrates a representative portion of another example seal 474, which is also considered to be a layer-less configuration. In this example, the seal 474 includes an annular core 86 that extends along a central core axis CA that extends circumferentially around the engine central axis A. Similar to the seal 374, the carbon fibers are in flat tows 84 that are wound in an overlapping manner around the central core axis CA on the annular core 86. For instance, as shown in a sectioned view in FIG. 10B, the flat tows 84 overlap each other such that each tow 84 has a section that is exposed and a section that is under the next, adjacent tow 84. In such a configuration, the edges of the tows 84 will lie in the plane of the outer surface of the seal 474. As a result, the outer surface of the seal 474 will have the edges of the tows 84 with carbon matrix 76*b* in between, which as above, may be selected to tailor wear performance.

Figure 11:
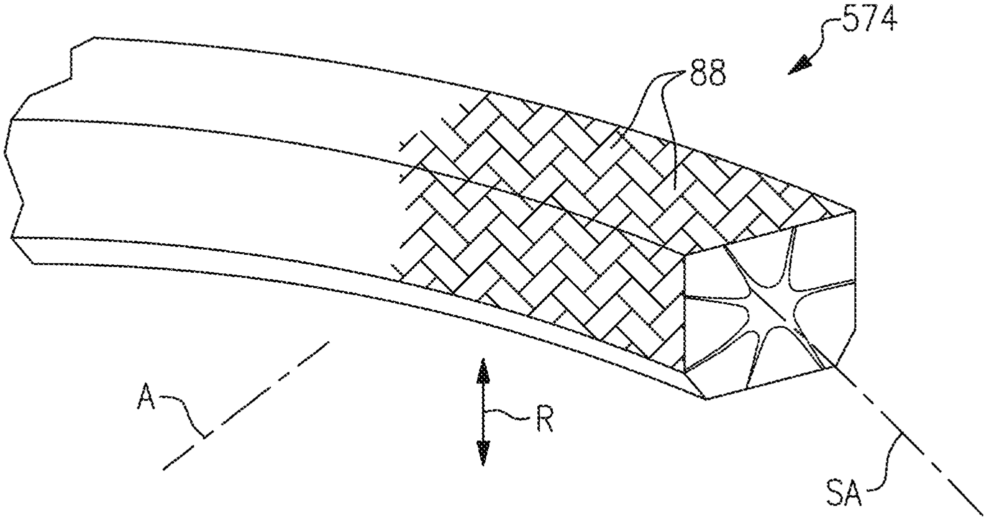
FIG. 11 illustrates a portion of another seal that is braided.
Figure 13:
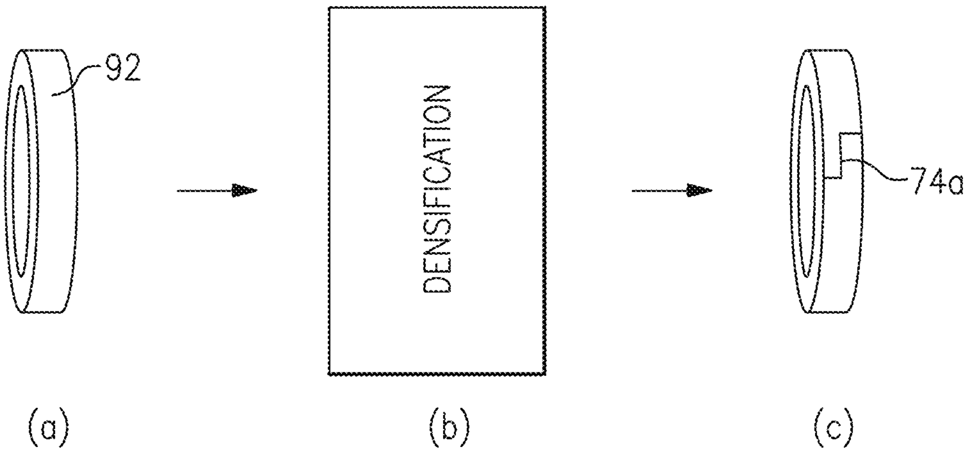
FIG. 13 represents a method of processing a seal.

FIG. 11 illustrates a representative portion of another example seal 574, which is also considered to be a layer-less configuration. In this example, the seal 574 extends along a seal axis SA that extends circumferentially around the axis A. The carbon fibers are in strands or tows 88 that are braided around the seal axis SA. A strand is a bundle of tows, filaments, or fibers that is twisted or otherwise held together in a single cord or rope. Here, three or more strands or tows 88 are braided together to form the seal 574. In such a configuration, the seal 574 may have a good balance of stiffness and strength in several directions. Moreover, since the strands or tows 88 curve around one another, some ends and some lengths of the strands or tows 88 will lie in the plane of the outer surface of the seal 574 along with carbon matrix 76*b* in between, which as above, may also be selected to tailor wear performance.

Figure 12:
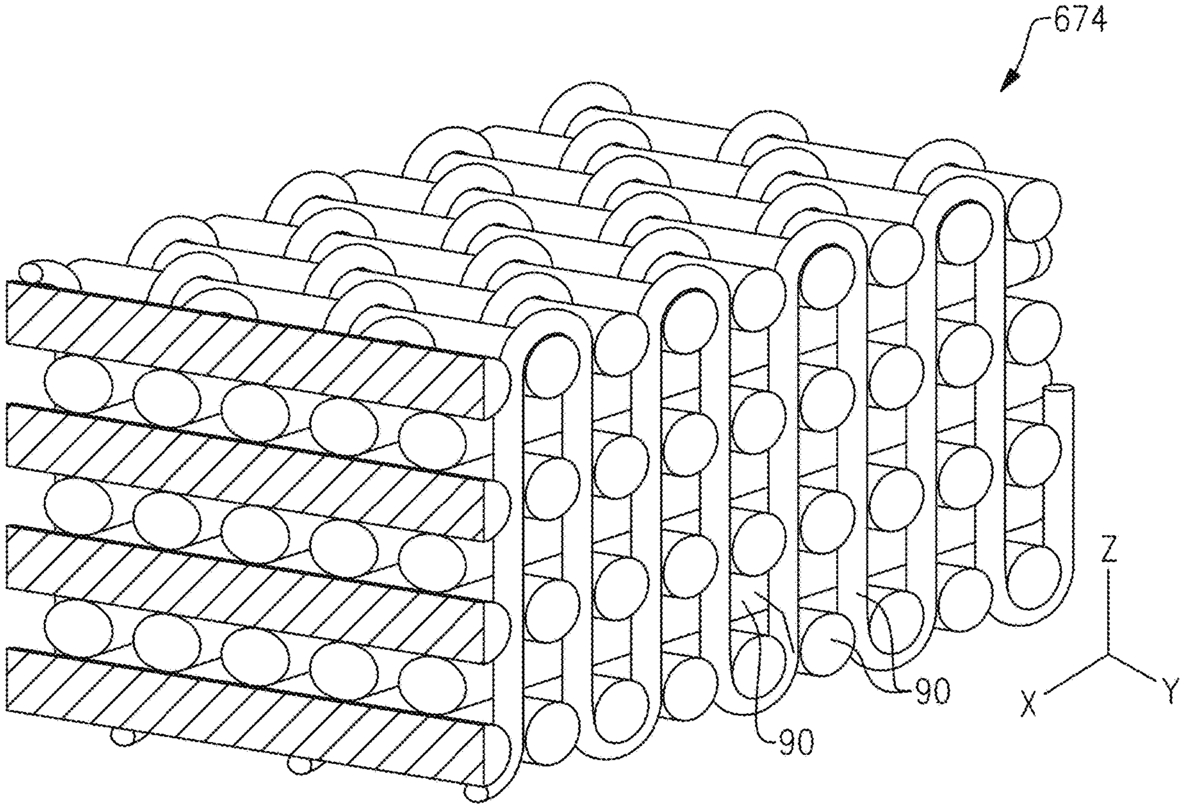
FIG. 12 illustrates a portion of another seal with a 3-D fiber architecture.

FIG. 12 illustrates a representative portion of the example seal 674, which is also a layer-less configuration. In this example, the carbon fibers or tows 90 that are in a 3-D woven architecture. For example, the illustrated 3-D woven architecture is an orthogonal woven fabric that includes warp tows (y-axis), weft tows (x-axis), and z-tows (z-axis). The z-tows extend in a through-thickness direction, while the warp and weft tows are straight and perpendicular to each other without interlacing. It is to be appreciated, however, that other types of 3-D woven architectures can alternatively be used. In such a configuration, the seal 674 may have excellent stiffness and strength in three directions. In further examples, the seal 674 is formed from a single layer of the 3-D woven fabric or from multiple layers of 3-D woven fabrics.

In general, the seals 74/174/274/374/474/574/674 herein may be fabricated from a carbon fiber preform. The carbon fiber preform may be pre-fabricated and then processed to form the seal 74/174/274/374/474/574/674, or the processing may include both fabrication of the carbon fiber preform and forming of the seal 74/174/274/374/474/574/674 from the preform. For example, the preform may be a workpiece that is densified with the carbon matrix, followed by cutting the seal out from the densified workpiece. Alternatively, the preform may be a hollow cylinder that is densified with the carbon matrix, followed by cutting a ring off of the densified cylinder to form the seal from the ring. In another alternative, the preform may be formed in the shape, or near shape, of the seal 74/174/274/374/474/574/674 and then densified, followed by one or more finishing processes to form the final seal. In each case, the fiber configuration of the final seal is dictated by the fiber architecture of the preform.

FIG. 12 illustrates a further example method. At (a) the method includes providing a carbon fiber preform 92. The preform 92 may be formed by wrapping or winding carbon fibers, strands, or tows. For example, for a radially stacked ply configuration, carbon fiber fabric may be wrapped layer-by-layer around a cylindrical mandrel. For a layer-less configuration, fibers or tows may be wound around a cylindrical mandrel. At (b) the carbon fiber preform 92 is then densified with the carbon matrix. If the preform is cylindrical, a ring is cut off from the cylinder to form the seal from the ring. The ring is then cut to form one or more of the afore-mentioned seams 74*a* at which opposed ends of the ring meet.

The densification process may be controlled and repeated as needed to achieve a final desired density and pore structure in the seal 74/174/274/374/474/574/674. A nominal volume percentage of porosity may be desired in order to infiltrate the oxidation inhibitor wash 78, if used, into the composite 76, but elevated porosities may debit wear performance. In general, the porosity may be, by vol. %, from about 1% to about 15%. The volume percentage of porosity may also be balanced with the average size of the pores. Generally, a small average pore size enhances strength, but the size should also be large enough to permit generous infiltration of the oxidation inhibitor wash 78. Given this description, one of ordinary skill in the art will be able to select a combination of volume percent porosity and average pore size that are in balance to meet their particular needs for infiltration and wear performance.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for processing a seal for a gas turbine engine, the method comprising:

providing a carbon fiber preform, wherein the carbon fiber preform is a cylinder;

densifying the carbon fiber preform with a carbon matrix and forming a carbon/carbon densified cylindrical workpiece;

forming a carbon/carbon composite ring by cutting the carbon/carbon composite ring off of the carbon/carbon densified cylindrical workpiece; and forming a seal by cutting the carbon/carbon composite ring to form at least one seam at which opposed ends of the carbon/carbon composite ring meet.

2. The method as recited in claim 1, wherein the seal is disposed about a central axis and has a multi-layer configuration of fiber plies in an axially stacked arrangement.

3. The method as recited in claim 1, wherein the seal is disposed about a central axis and has a multi-layer configuration of fiber plies in a radially stacked arrangement relative to the central axis.

4. The method as recited in claim 1, wherein the seal has a layer-less configuration, without fiber plies, in which the carbon fibers have a unidirectional orientation and extend circumferentially.

5. The method as recited in claim 1, wherein the carbon fibers are in flat tows that are elongated in directions that are oblique to an engine central axis.

6. The method as recited in claim 1, wherein the seal includes an annular core that extends along a central core axis, and the carbon fibers are in flat tows that are would around the central core axis on the annular core.

7. The method as recited in claim 1, wherein the seal extends circumferentially along a seal axis, and the carbon fibers are in strands that are braided around the seal axis.

8. The method as recited in claim 1, wherein the seal has a 3-D fiber architecture.

9. The method as recited in claim 1, wherein in the seal the carbon fibers are, by volume, 35% to 65% of the carbon/carbon composite ring.

10. The method as recited in claim 1, wherein the seal includes an annular core extending along a central core axis, and the carbon fiber preform includes carbon fibers arranged in a series of flat tows that are wound around the central core axis on the annular core such that each of the flat tows partially overlaps an immediately prior flat tow in the series of flat tows.

11. The method as recited in claim 10, wherein each of the flat tows are wound fully circumferentially around the central core.

12. The method as recited in claim 11, wherein in the seal the carbon fibers are, by volume, 35% to 65% of the carbon/carbon composite ring.

13. The method as recited in claim 12, wherein edges of the flat tows lie in a plane of an outer surface of the seal.

14. The method as recited in claim 13, wherein the carbon matrix is disposed in between the edges of the flat tows.

15. The method as recited in claim 14, wherein the edges of the flat tows are exposed at the outer surface of the seal.

16. The method as recited in claim 14, wherein the forming of the seal includes cutting at least one lapjoint joint seam, butt joint seam, or scarf joint seam in the carbon/carbon composite ring to produce a split ring.

17. The method as recited in claim 14, further comprising infiltrating an oxidation inhibitor into pores of the carbon/carbon composite ring, and the oxidation inhibitor is mono-aluminum-phosphate.

18. The method as recited in claim 1, wherein the densified cylindrical workpiece has an axial length greater than an axial width of the carbon/carbon composite ring.

19. The method as recited in claim 1, wherein the carbon/carbon composite ring has a porosity, by volume, of about 1% to about 15%.

20. The method as recited in claim 1, wherein the carbon fibers and the carbon matrix are substantially pure graphite.

* * * * *